US006536537B1

(12) United States Patent
Sasaki et al.

(10) Patent No.: US 6,536,537 B1
(45) Date of Patent: Mar. 25, 2003

(54) SCREW DRIVERS

(75) Inventors: Katsuhiko Sasaki, Anjo (JP); Kazunori Tsuge, Anjo (JP); Yukihiko Yamada, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/515,640

(22) Filed: Feb. 29, 2000

(30) Foreign Application Priority Data

Mar. 1, 1999 (JP) ........................................... 11-052779

(51) Int. Cl.[7] ................................................. B23Q 5/00
(52) U.S. Cl. ........................ 173/178; 173/176; 173/179
(58) Field of Search ................................ 173/176, 178, 173/179; 81/54, 57.11, 470

(56) References Cited

U.S. PATENT DOCUMENTS

| | | | | |
|---|---|---|---|---|
| 4,655,103 A | | 4/1987 | Schreiber | |
| 5,134,909 A | * | 8/1992 | Sasaki | 81/473 |
| 5,181,575 A | * | 1/1993 | Maruyama | 173/180 |
| 5,372,206 A | * | 12/1994 | Sasaki et al. | 173/178 |
| 5,538,089 A | * | 7/1996 | Sanford | 173/13 |
| 5,568,849 A | * | 10/1996 | Sasaki et al. | 192/34 |
| 5,735,183 A | * | 4/1998 | Sasaki | 81/473 |
| 5,947,210 A | | 9/1999 | Sasaki et al. | |

FOREIGN PATENT DOCUMENTS

| | | |
|---|---|---|
| EP | 0502748 | 9/1992 |
| EP | 0666145 | 8/1995 |
| EP | 0724934 | 8/1996 |
| JP | 11019879 | 1/1999 |

OTHER PUBLICATIONS

Makita Corporation—General Catalogue 1998/1999, p. 61.

* cited by examiner

*Primary Examiner*—Scott A. Smith
*Assistant Examiner*—Chukwurah Nathaniel
(74) *Attorney, Agent, or Firm*—Dennison, Schultz & Dougherty

(57) ABSTRACT

The present invention relates to a powered screw driver having a spindle 20 that is caused to rotate by an electric motor 10 within a range of about 5000 rpm (revolutions per minute) to about 7000 rpm (revolution per minute) when the spindle 20 idles. Because the spindle 20 rotates at a high revolution speed, the screw-fastening operation can more quickly be completed when the user of the screw driver 1 fastens the screw in a normal posture. The screw driver 1 may used to fasten screws having a pitch within a range of about 1.3 mm to 2.0 mm (i.e. about 1/32 inch to 3/32 inch).

14 Claims, 6 Drawing Sheets

SCREW DRIVERS

BACKGROUND OF THE INVENTION

1. Field of the Invention

The present invention relates to screw drivers, and more particularly to screw drivers that have a spindle idling speed of about 5000 to 7000 rpm, when not fastening screws.

2. Description of the Related Art

Power screw drivers may be utilized to fasten screws to a variety of objects, such as decorative boards, plasterboards, asbestos boards or similar boards (hereinafter simply referred as "boards") for the interior of an architectural structure by utilizing self tapping screws, such as wood screws, drywall screws and texscrews (hereinafter simply referred as "screws"). As shown in FIG. 9 to FIG. 13, a user M may utilize a screw driver T to fasten a screw into a board using a variety of postures. For example, user M may fasten the screw into a floor board while standing in a downward posture as shown in FIG. 9 or in an upward posture as shown in FIG. 12. Moreover, user M may fasten the screw into a wall board by holding the screw driver T at the level of the user's waist as shown in FIG. 10, or at the level of the user's shoulders as shown in FIG. 11 or at the level of the user's head as shown in FIG. 13. In FIG. 9 to FIG. 13, symbol M represents the user of the screw driver, symbol T represents the screw driver, symbol F represents the floor, symbol K represents the wall and symbol J represents a ceiling.

A pushing force is necessary to push the screw driver in a screw-fastening direction in order to perform the screw-fastening operation. The user's ability to provide a strong pushing force is generally diminished when the user holds the screw driver at the level of the user's head as shown in FIG. 13. A similar problem occurs when the user fastens the screw in an upward posture as shown in FIG. 12. As the pushing force for fastening the screw is reduced, the burden on the user to utilize the screw driver will increase, because the screw-fastening performance depends not only on the rotation speed of the spindle of the screw driver, but also on the pushing force applied by the screw driver. Thus, if the spindle rotation speed is a constant, the screw-fastening performance will vary only based on the pushing force. In known screw drivers, the standard spindle revolution speed is within a range of 1800 rpm to 2500 rpm. With known screw drivers, when the pushing force is reduced, the screw-fastening performance is significantly affected and the user of the screw driver tends to become tired.

SUMMARY OF THE INVENTION

It is, therefore, an object of the present invention to provide improved screw drivers that reduce the burden on the user.

Preferred screw drivers may include a motor coupled to a spindle for driving a bit. The bit can be inserted into the head of the screw in order to drive the screw into an object, such as a board. The screw driver may preferably fasten a screw that has a pitch within a range of 1.3 mm to 2.0 mm, as well as a range of 1/32 inch to 3/32 inch. Most preferably, the spindle may idle at a speed within a range of about 5000 rpm (revolutions per minute) to about 7000 rpm in order to increase the screw driving performance when the user begins to drive a screw into an object.

Because the spindle rotates at a relatively high revolution speed, the screw-fastening operation can be completed more quickly, even if the user is fatigued. Thus, preferred screw drivers assist the user in easily performing screw-fastening operations.

Other objects, features and advantages of the present invention will be readily understood after reading the following detailed description together with the accompanying drawings and the claims.

DETAILED DESCRIPTION OF THE INVENTION

Figure 1:
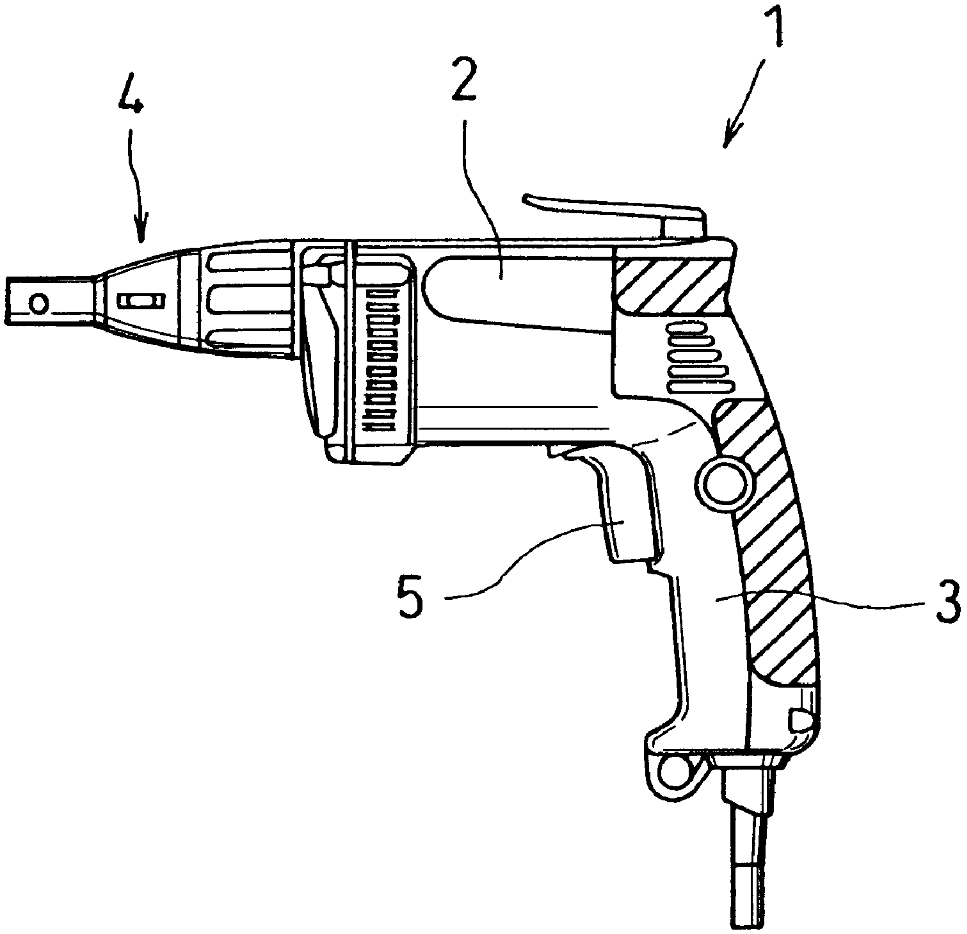
FIG. 1 shows a screw driver according to a representative embodiment of the present teachings.

Preferably, a power screw driver spindle rotates by means of an electric motor within a range of about 5000 rpm to about 7000 rpm when the spindle is idling. The idling state of the spindle is defined as the state of the screw driven in which the spindle rotates when it is not being used to drive a screw into an object (i.e., without a load). Because the present spindle rotates at a higher speed than the speed of known screw drivers, the screw-fastening operation can be completed more quickly when the user fastens screws under ordinary conditions. Further, the screw-fastening performance may not be diminished, even if the user can not push so hard against the screw, due to fatigue or a difficult posture.

The present screw drivers are preferably utilized with screws having a pitch within a metric range of about 1.3 mm to 2.0 mm, which corresponds to an English range of about 1/32 inch to 3/32 inch. Most preferably, the spindle preferably rotates at approximately 6000 revolution per minute.

Thus, screws having a pitch within a range of 1.3 mm to 2.0 mm, as well as a screw that has a pitch within a range of 1/32 inch to 3/32 inch, may most preferably be fastened by the representative screw driver having a spindle that rotates within a range of about 5000 rpm to about 7000 rpm or, more preferably about 6000 rpm. Such preferred conditions were determined based upon experimental analysis. In particular, it was discovered that when an average adult man uses the representative screw driver, it will be most comfortable for the user to bend and stretch his arm in the horizontal direction (while operating a screw driver of about 1.4 kg (about 3 lbs)) at a speed within a range of 130 mm/s to 180 mm/s. In view of such bending and stretching speeds, the most preferable rotation speed of the spindle in order to fasten a screw is preferably about 6000 revolution per minute when idling in order to provide excellent screw driving performance. Further, the screw driving performance is further enhanced at that spindle speed if the screw has a pitch within a range of about 1.3 mm to 2.0 mm (about 1/32 inch to 3/32 inch) and the screw is being fastened into a board, such as one of the boards identified above.

Moreover, the screw driver spindle may rotate in accordance with rotation of the drive means when the spindle moves rearward with respect to the axial direction of the spindle. Preferably, the screw driver may include a clutch that transmits the torque of the drive means to the spindle. The "drive means" may include a driving shaft coupled to the electric motor or may include the driving shaft and another parts, such as gears and shafts, that are utilized to transmit the driving force of the electric motor to the clutch. Within the clutch, clutch teeth of the spindle may engage the clutch teeth of the drive means when the spindle moves rearward with respect to the axial direction of the spindle. In such structure, the spindle rotates in accordance with the drive means when the spindle moves rearward. When the clutch teeth of the rotating spindle become engaged with the clutch teeth of the rotating drive means, the clutch teeth on the spindle and the clutch teeth of the drive means can rotate integrally. For this reason, even when the rotating speed of the drive means and the spindle are relatively high (about 5000 rpm to 7000 rpm), the clutch teeth on both sides can be smoothly engaged. As the result, the spindle can rotate within a range of about 5000 rpm to 7000 rpm without diminishing the durability of the clutch.

Each of the additional features and method steps disclosed above and below may be utilized separately or in conjunction with other features and method steps to provide improved screw drivers and methods for designing and using such screw drivers. Representative examples of the present invention, which examples utilize many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

FIGS. 1 to 8 show the detailed structure of a representative embodiment. FIG. 1 shows a representative screw driver 1 having a main body 2, a handle portion 3 and a nose portion 4. A trigger type main switch 5 is provided at a base end of the handle portion 3. When the main switch 5 is pulled, an electric motor 10 provided within the main body portion 2 is actuated.

Figure 2:
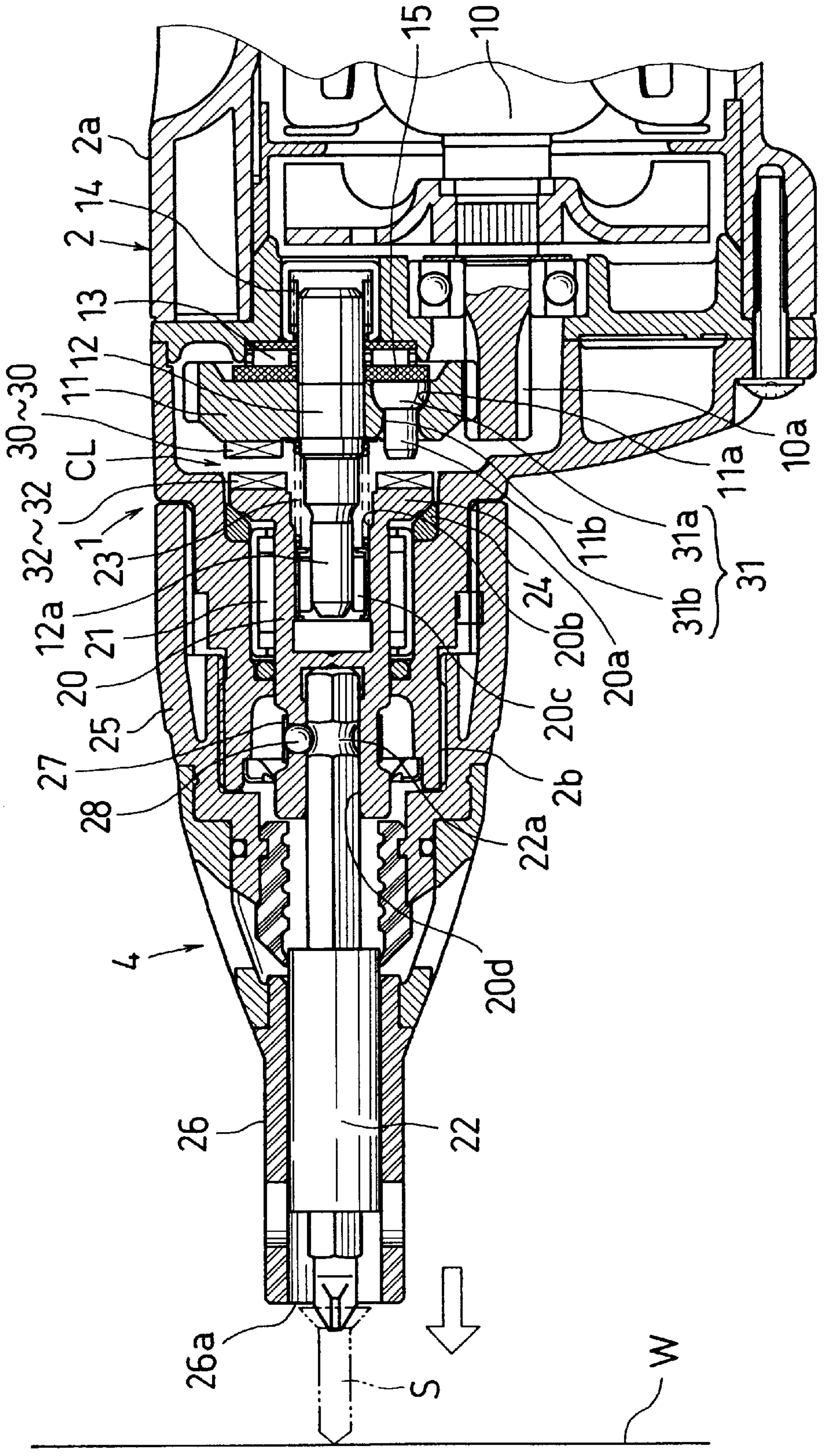
FIG. 2 shows a detailed structure of a screw driver in part and shows a state in which a silent clutch is not engaged.
Figure 3:
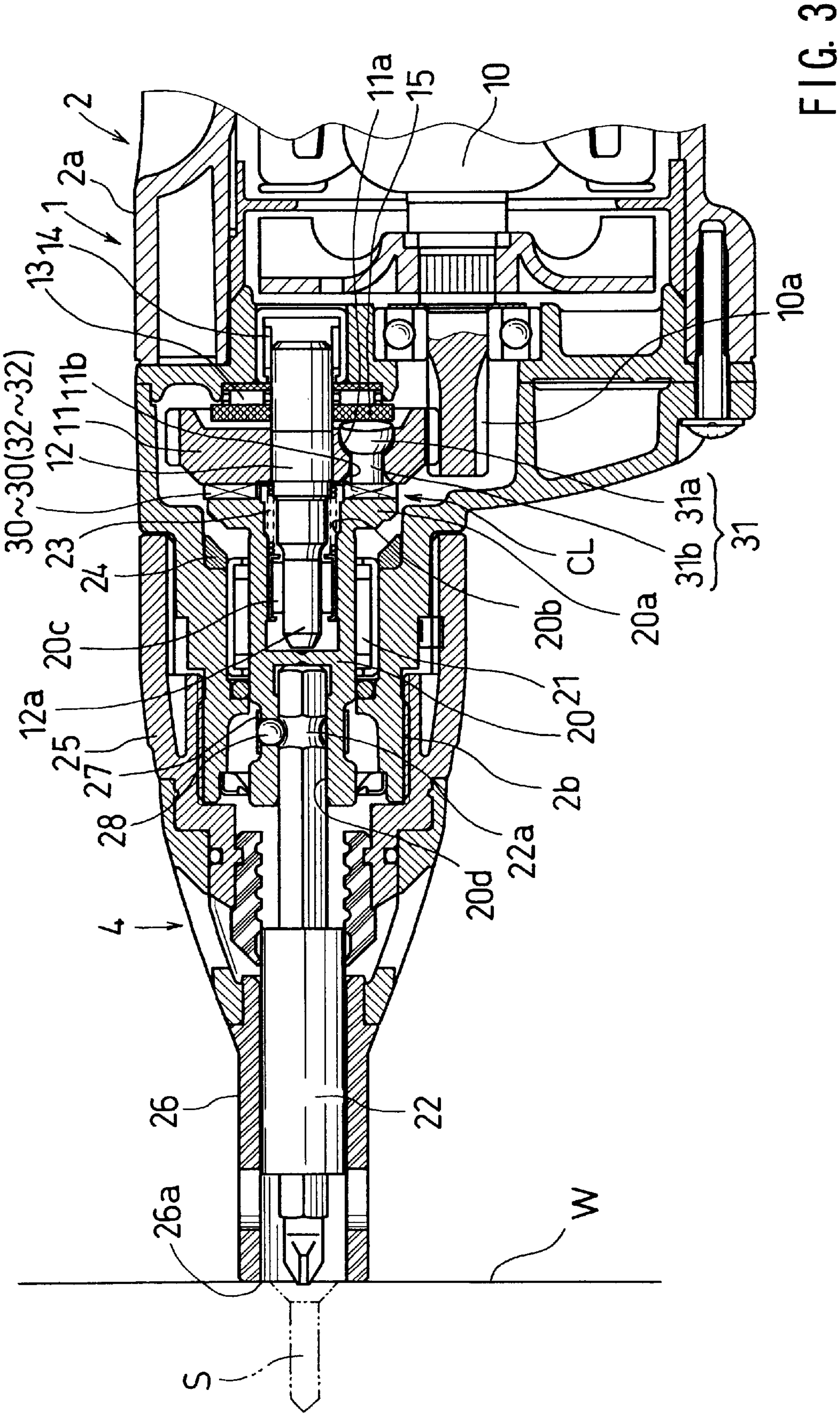
FIG. 3 shows a detailed structure of a screw driver in part and shows a state in which the silent clutch is engaged.

FIGS. 2 and 3 shows the detailed structure of the main body 2 and the nose portion 3. However, to improve clarity, FIGS. 2 and 3 only show the forward end of the main body 2. A pinion gear 10*a* is attached to an output shaft of the electric motor 10 and is engaged with a driving gear 11, which is coupled to a driving shaft 12. A forward end of the driving shaft 12 (left-sided end portion in FIGS. 2 and 3) is supported by a spindle 20. A rear end of the driving shaft 12 (right-sided end portion in FIGS. 2 and 3) is supported by a bearing 14, such that the driving shaft 12 can rotate and the driving shaft 12 can move in an axial direction of the driving shaft 12. A thrust bearing 13 and a bearing plate 15 are provided between the bearing 14 and the driving gear 11. The driving shaft 12 also can move in the axial direction with respect to the thrust bearing 13 and the bearing plate 15.

A silent clutch CL is preferably provided between the driving gear 11 and the spindle 20. The silent clutch CL may transmit the torque of the driving shaft 12 to the spindle 20 by utilizing the engagement of clutch teeth that will be described in detail below.

A representative detailed structure of the silent clutch CL is shown in FIGS. 4–8. Clutch teeth 30 are provided on a forward end surface of the driving gear 11 (left sided surface of the driving gear 11 in the drawings) at constant intervals. Clutch pins 31 are provided between the clutch teeth 30 and each clutch pin 31 projects towards the forward end, such that each clutch pin 31 can be inclined. Each clutch pin 31 includes a head portion 31*a* that has an approximately hemispheric shape, and an engagement pin portion 31*b* that projects from the head portion 31*a* towards the forward end. The head portion 31*a* is inserted into a hemispheric receiving hole 11*a* formed on a rear end surface of the driving gear 11 (right-side surface of the driving gear 11 in the drawings). An engagement pin portion 31*b* is inserted into and penetrates through an insertion hole 11*b*. A concave portion 11*c* is formed on a rear side of the insertion hole 11*b* in the rotating direction of the driving gear 11 (right side in FIGS. 4 through 8). The concave portion 11*c* enables the clutch pin 31 to be inclined towards the rear side in the rotating direction of the driving gear 11 (see FIGS. 6 and 7).

Figure 6:
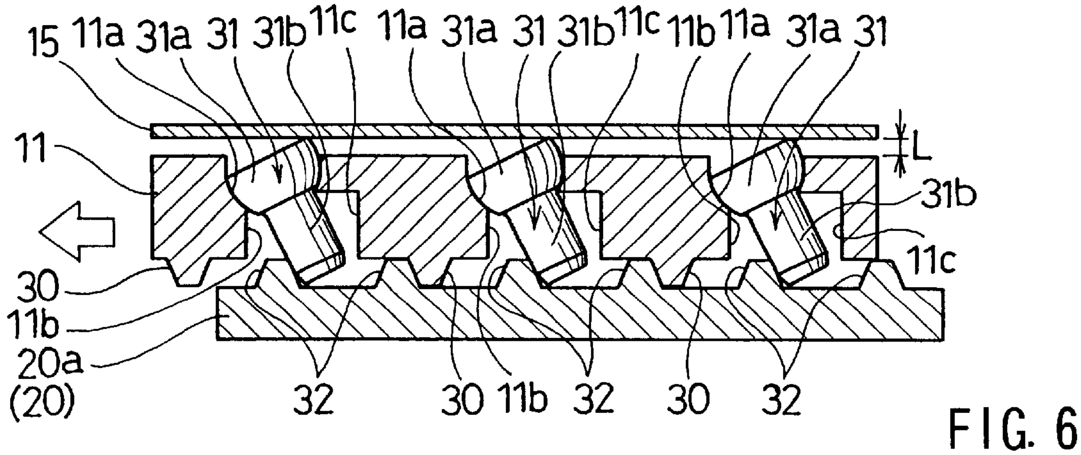
FIG. 6 shows a driving gear and a flange portion of a spindle and shows a state in which clutch pins are inclined so that both the driving gear and the flange portion are engaged with each other.
Figure 7:
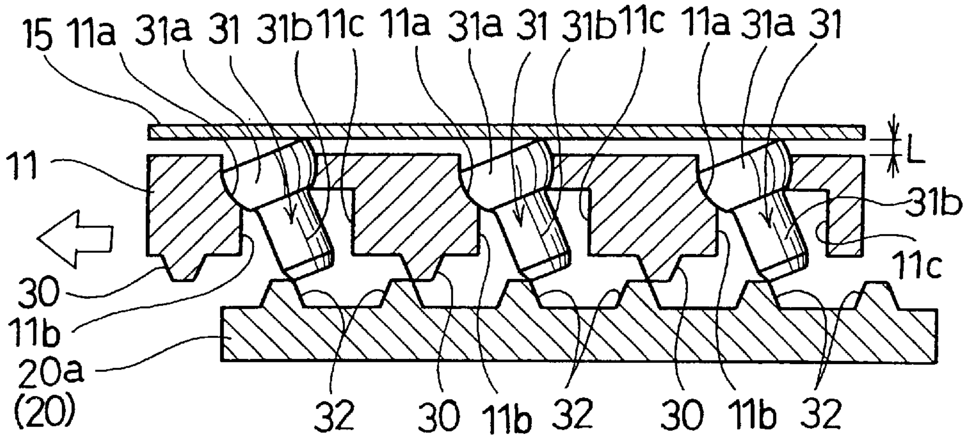
FIG. 7 shows a driving gear and a flange portion of a spindle and shows a state just before the screw-fastening operation is completed and just before an engagement of the spindle with the driving gear is released.

As shown in FIGS. 2, 4, 5 and 8, when the engagement pin portions 31*b* are not inclined, the upper surface of the driving gear 11 contacts the bearing plate 15, because upper surfaces of the head portions 31*a* are positioned to be flush with upper surface of the driving gear 11. To the contrary, as shown in FIGS. 3, 6, and 7, when the engagement pin portions 31*b* are inclined, square portions of the head portions 31*a* protrude from the upper surface of the driving gear 11 and the protruded portions contact the bearing plate 15. Thus, the driving gear 11 moves towards the forward end (downward direction in FIGS. 4 through 8) with the driving shaft 12. As the result, a gap L is formed between the driving gear 11 and the bearing plate 15.

As shown in FIGS. 2 and 3, the forward end side of the driving shaft 12 projects from the forward end surface of the driving gear 11. Such projected forward end portion 12*a* is inserted into a supporting hole 20*b* formed in the center of the rear end surface of the spindle 20. Thus, the projected forward end portion 12*a* is supported by a bearing 20*c* mounted in the supporting hole 20*b*, such that the projected forward end portion can rotate and move in its axial direction. A spring 23 is provided between the bearing 20*c* and the driving gear 11, which spring 23 exerts a biasing force onto the driving gear 11 and the driving shaft 12. As the result, the driving gear 11 is pressed against the bearing plate 15. That is, the clutch pins 31 will be inclined against the biasing force of the spring 23.

When the spindle 20 and the driving gear 11 rotate together as a result of the biasing force of the spring 23, the spindle 20 will rotate in accordance with the rotation of the driving gear 11. Thus, the spindle 20 rotates at the idling speed, i.e., the spindle 20 rotates without a load. To the contrary, when the spindle 20 is pushed onto a stopper 24, slip occurs between the end portion of the spring 23 and the end surface of the bearing 20*c* or the side surface of the driving gear 11. As the result, the torque of the driving shaft 12 (driving side) will not be transmitted to the spindle 20 and the spindle 20 will not rotate.

A flange portion 20*a* and clutch teeth 32 are formed on the rear end portion of the spindle 20. The clutch teeth 32 of the spindle 20 face the clutch teeth 30 and the clutch pins 31 of the driving shaft 12.

The spindle 20 is supported by a main body 2*a* by means of a bearing 21, such that the spindle 20 can rotate and move in its axial direction. However, when the flange portion 20*a* of the spindle 20 is pushed against the stopper 24, which is made of rubber and mounted to the main body 2*a* by means of the biasing force of the spring 23, the rotation of the spindle 20 is hindered by the stopper 24 and the idling motion of the spindle 20 is obstructed.

When the spindle 20 moves rearward (right-side direction in the drawings) in accordance with the screw-fastening operation, the flange portion 20*a* separates from the stopper 24. As the result, the rotation of the spindle 20 is no longer hindered by the stopper 24 and the spindle 20 can rotate by means of the biasing force of the spring 23 in accordance with the rotation of the driving shaft 12.

Thus, when the spindle 20 moves rearward in its axial direction and the flange portion 20*a* separates from the stopper 24, the spindle 20 starts to rotate in accordance with the rotation of the driving shaft 12. When the spindle 20 further moves rearward, the clutch teeth 32 of the spindle 20 and the clutch teeth 30 of the driving shaft 12 engage each other within the silent clutch CL. That is, both clutch teeth 30 and 32 within the silent clutch CL can engage each other while both the driving gear 11 and the spindle 20 rotate.

A bit mounting hole 20*d* for inserting a driver bit 22 for the screw-fastening operation is formed at the center of the front surface of the spindle 20. A steel ball 28 is provided in the bit mounting hole 20*d.* A biasing force is exerted onto the steel ball 28 in an inner radial direction by a plate spring 27. The driver bit 22 is mounted to the bit mounting hole 20*d* by inserting the rearward end side of the driver bit 22 into the bit mounting hole 20*d.* When the driver bit 22 is inserted into the bit mounting hole 20*d,* the steel ball 28 shifts to the outer radial direction against the biasing force of the plate spring 27. When the driver bit 22 is pushed to a certain position, the steel ball 28 fits into an engagement groove 22*a* of the driver bit 22 and thus, the mounting operation of the driver bit 22 is completed.

An adjust sleeve 25 is mounted onto the forward end of the main body 2*a* by means of a screw axis portion 2*b*. A stopper sleeve 26 is detachably mounted onto the forward end of the adjust sleeve 25. The forward end of the driver bit 22 slightly projects from the forward end of the stopper sleeve 26. A position of the forward end of the stopper sleeve 26 (stopper surface 26*a*) with respect to the driver bit 22 can be adjusted by rotating and moving the adjust sleeve 25 in its axial direction. Thus, the screw-fastening depth can be adjusted.

Figure 4:
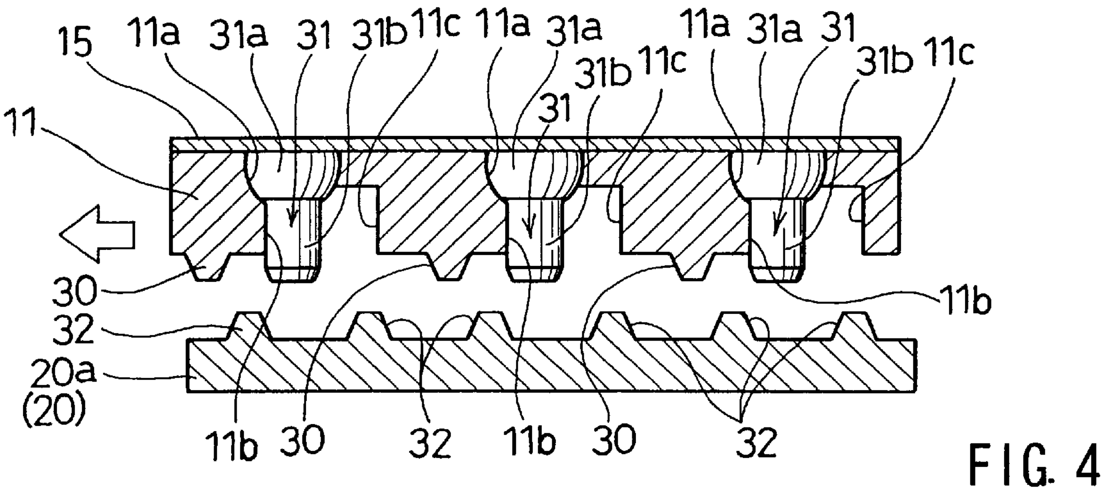
FIG. 4 shows a detailed structure of a driving gear and a flange portion of a spindle and shows a state in which the flange portion is not engaged with the driving gear.

The representative screw driver 1 is preferably operated as follows. In FIG. 4 the screw driver 1 has not yet been pushed and the flange portion 20*a* of the spindle 20 is not engaged with the driving gear 11 by the biasing force of the spring 23. That is, the flange portion 20*a* of the spindle 20 is pushed against the stopper ring 24 and thus, the spindle 20 can not rotate. When the user of the screw driver 1 pulls the trigger 5, the electric motor 10 is actuated and the driving gear 11 rotates (the rotating direction of the driving gear 11 is indicated by an arrow in FIG. 4). At this stage, the clutch pins 31 are brought into the upright or vertical state by the indirect action of the biasing force exerted by the spring 23. When the screw driver 1 is pushed down by the user from this state, the flange portion 20*a* of the spindle 20 separates from the stopper 24 and the spindle 20 starts rotating in accordance with the rotation of the driving shaft 12.

Figure 5:
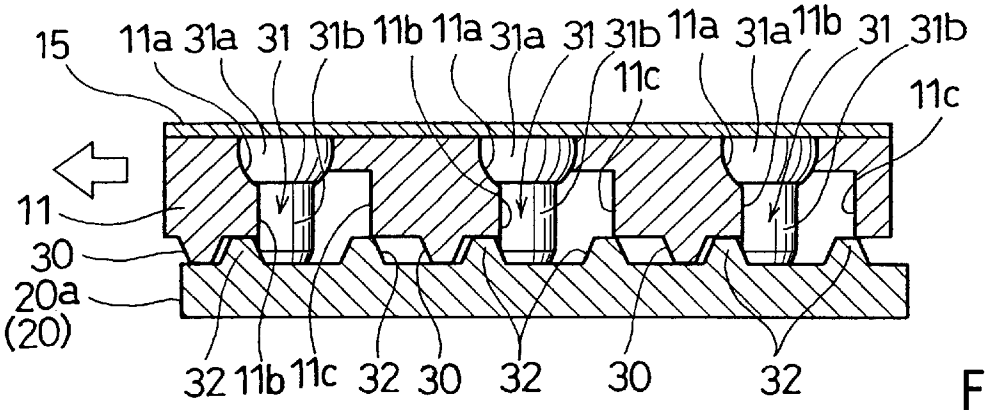
FIG. 5 shows a driving gear and flange portion of a spindle and shows a state in which the flange portion contacts with the driving gear.

When the spindle 20 moves rearward by the pushing down operation of the screw driver 1 while the spindle 20 rotates in accordance with the driving shaft 12, the flange portion 20*a* of the spindle 20 is pushed to the driving gear 11 as shown in FIG. 5. Therefore, the clutch teeth 32 on the spindle 20 are inserted into gaps between the clutch teeth 30 and the clutch pins 31 on the driving gear 11. At the same time, the driving gear 11 moves into the rotating direction with respect to the flange portion 20*a* as shown in FIG. 6. Accordingly, the clutch teeth 32 on the spindle 20 relatively move to the rearward side of the rotating direction (right direction in FIGS. 5 and 6). Thus, the clutch pins 31 are inclined at a constant angle to the rear side in the rotating direction. As the result, the clutch pins 31, the clutch teeth 30 and the clutch teeth 32 of the spindle 20 engage each other and the driving force of the driving gear 11 is transmitted to the spindle 20, thereby enabling the screw-fastening operation.

As shown in FIGS. 2 and 3, while the screw S is gradually being fastened, the screw driver 1 gradually moves into a board W (in the left direction in FIGS. 2 and 3). At the conclusion of the screw driving operation, the stopper surface 26*a* of the stopper sleeve 26 comes into contact with the board W, after which only the driver bit 22 and the spindle 20 move in the screw-fastening direction. Therefore, as shown in FIG. 7, the engagement depth of the clutch teeth 32 with the clutch pins 31 and the engagement depth of the clutch teeth 32 with the clutch teeth 30 gradually becomes shallower until these parts disengage. Thus, the screw-fastening operation is completed.

Figure 8:
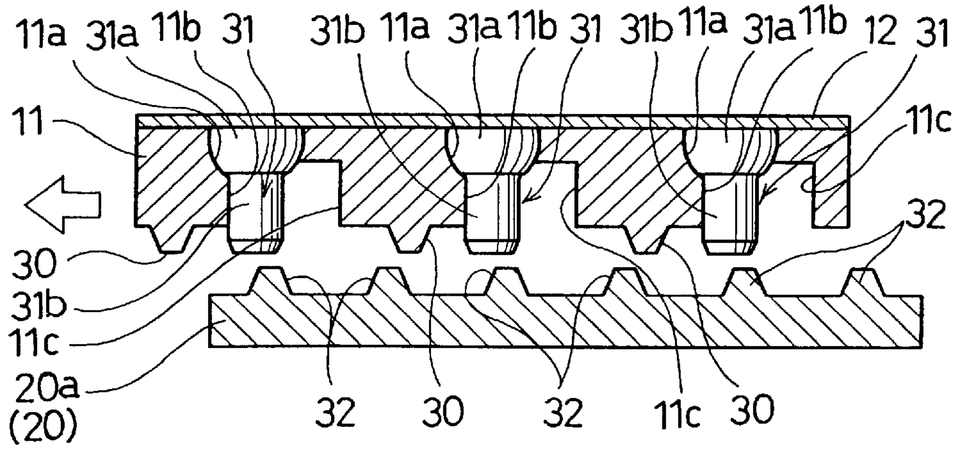
FIG. 8 shows a driving gear and a flange portion of a spindle and shows a state in which clutch pins are returned to a serial position so that the engagement of the spindle with the driving gear is completely released.
Figure 9:
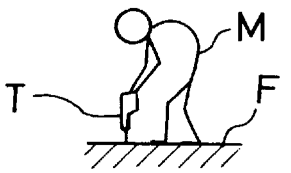
FIG. 9 shows a screw-fastening operation in a downward posture.
Figure 10:
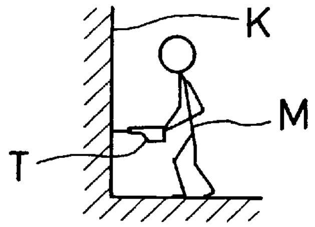
FIG. 10 shows a screw-fastening operation by holding a screw driver at the user's waist.
Figure 11:
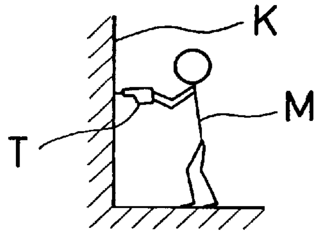
FIG. 11 shows a screw-fastening operation by holding a screw driver at the user's shoulders.
Figure 12:
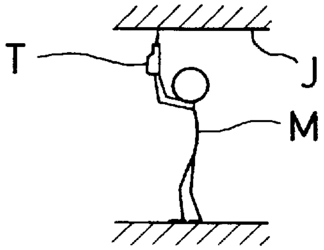
FIG. 12 shows a screw-fastening operation in an upward posture.
Figure 13:
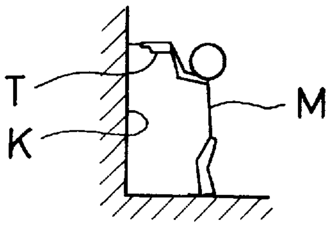
FIG. 13 shows a screw-fastening operation by holding a screw driver at the user's head.

When the clutch teeth 32 are released from the clutch pins 31 as shown in FIG. 8, the clutch pins 31 are immediately returned to the upright posture by the biasing force of the spring 32. Thus, the driving gear 11 moves back by a distance L by the biasing force of the spring 23 and the driving gear 11 is pushed against the thrust bearing 12. As the result, the clutch teeth 32 are released from the clutch pins 31 and a gap is formed between the clutch pins 31, the clutch teeth 30 and the clutch teeth 32. As the result, the clutch CL can idle silently.

In the representative screw driver 1, the driving gear 11 may rotate within a range of about 5000 rpm (revolution per minute) to 7000 rpm. Most preferably, the driving gear 11 may rotate approximately at 6000 rpm. Therefore, the spindle 20 may also rotate within a range of about 5000 rpm (revolution per minute) to 7000 rpm, when the spindle rotates in accordance with the rotation of the driving shaft 12. Most preferably, the spindle may rotate approximately at 6000 rpm. Further, screws having a pitch within a range of about 1.3 mm to 2.0 mm (i.e. about 1⁄32 inch to 3⁄32 inch) are preferred, but not required. With respect to the representative screw driver 1, the most preferable condition for fastening a screw is to utilize the spindle 20 (driving shaft 12) that rotates approximately at 6000 rpm to fastening a screw that has a pitch within a range of 1.3 mm to 2.0 mm (i.e. about 1⁄32 inch to 3⁄32 inch).

As described above, the spindle 20 has already begun rotating in accordance with the rotation of the driving gear 11 when the clutch teeth 32 of the spindle 20 engage with the clutch pins 31 and with the clutch teeth 30 of the driving shaft 12. Therefore, even if the driving gear 11 rotates at a speed higher than the rotation speeds of known screw drivers (1800 rpm to 2500 rpm), the impact at the time of the engagement of the clutch teeth 30, 32 can remarkably be reduced. Therefore, high durability of the clutch teeth 30, 32 and the clutch pins 31 can be attained. Further, the screw-fastening operation can be easily and quickly performed.

Such screw-fastening technique, i.e., rotating the spindle at a high speed, may also be applied to a screw driver that utilizes a clutch other than the clutch utilized in the above-described representative embodiment and to a screw driver that does not utilize any clutch. Also in such variations, the spindle may preferably rotate within a range of about 5000 rpm to 7000 rpm and the screw that is fastened by the screw driver may preferably have a pitch within a range of 1.3 mm to 2.0 mm (i.e. about 1⁄32 inch to 3⁄32 inch), thereby minimizing the fatigue of the user.

The present techniques can be utilized with both cordless screw drivers powered by a battery pack and usual screw drivers powered by a high voltage power source.

What is claimed is:

1. A screw driver comprising:
   - a housing,
   - a motor disposed within the housing,
   - a drive shaft coupled to the motor, the motor being arranged and constructed to rotate the drive shaft at a rotational speed within a range of about 5000 rpm to about 7000 rpm,
   - a spindle rotatably supported by the housing,
   - a driver bit coupled to the spindle,
   - a clutch coupling the drive shaft to the spindle when the clutch is engaged, wherein the motor, the drive shaft, the clutch and the spindle are arranged and constructed to rotate the spindle and the driver bit within the rotational speed range of about 5000 rpm to about 7000 rpm when the clutch is engaged during a fastening operation, and
   - means for rotating the spindle at substantially the same rotational speed as the driving shaft before the clutch is engaged.

2. A screw driver as in claim 1, wherein the motor, the drive shaft, the spindle, the clutch and the rotating means are arranged and constructed to rotate the spindle and the driver bit at a rotational speed of about 6000 rpm before the clutch is engaged.

3. A screw driver as in claim 2, wherein the clutch comprises a first plurality of fixed disposed teeth, a plurality of clutch pins pivotally disposed proximal to the first plurality of fixedly disposed teeth, and a second plurality of fixedly disposed teeth disposed so as to oppose the first plurality of fixedly disposed teeth and the clutch pins, and wherein the clutch is engaged when the first plurality of fixedly disposed teeth engage the second plurality of fixedly disposed teeth.

4. A screw driver as in claim 3, wherein the rotating means comprises a coil spring frictionally contacting the drive shaft and the spindle.

5. A screw driver as in claim 1, wherein the clutch comprises a first plurality of fixedly disposed teeth, a plurality of clutch pins pivotally disposed proximal to the first plurality of fixedly disposed teeth, and a second plurality of fixedly disposed teeth disposed so as to oppose the first plurality of fixedly disposed teeth and the clutch pins, and wherein the clutch is engaged when the first plurality of fixedly disposed teeth engage the second plurality of fixedly disposed teeth.

6. A screw driver as in claim 1, wherein the rotating means comprises a coil spring frictionally contacting the drive shaft and the spindle.

7. A method for fastening a screw having a pitch within a range of about 1.3 mm to 2.0 mm using a screw driver, wherein the screw driver comprises:
   - a housing,
   - a motor disposed within the housing,
   - a drive shaft coupled to the motor, the motor being arranged and constructed to rotate the drive shaft at a rotational speed within a range of about 5000 rpm to about 7000 rpm,
   - a spindle rotatably supported by the housing,
   - a driver bit coupled to the spindle,
   - a clutch coupling the drive shaft to the spindle when the clutch is engaged, wherein the motor, the drive shaft, the clutch and the spindle are arranged and constructed to rotate the spindle and the driver bit within the rotational speed range of about 5000 rpm to about 7000 rpm when the clutch is engaged, and
   - means for rotating the spindle at substantially the same rotational speed as the driving shaft before the clutch is engaged, the method comprising:
   - rotating the spindle at a rotational speed substantially between about 5000 rpm to about 7000 rpm before engaging the clutch,
   - engaging clutch so that the spindle and the driver bit rotate between about 5000 rpm to about 7000 rpm,
   - fastening the screw while rotating the spindle and the driver bit at between about 5000 rpm to about 7000 rpm, and
   - upon completing the screw fastening step, rotating the spindle between about 5000 rpm to about 7000 rpm with the clutch disengaged.

8. A method as in claim 7, wherein the spindle rotates substantially at about 6000 rpm before and after the screw fastening step.

9. A method as in claim 7, wherein the clutch comprises a first plurality of fixedly disposed teeth, a plurality of clutch pins pivotally disposed proximal to the first plurality of fixedly disposed teeth, and a second plurality of fixedly disposed teeth disposed so as to oppose the first plurality of fixedly disposed teeth and the clutch pins, and wherein the clutch is engaged when the first plurality of fixedly disposed teeth engage the second plurality of fixedly disposed teeth, and wherein the clutch engaging step comprises engaging the first plurality of fixedly disposed teeth with the second plurality of fixedly disposed teeth while the second plurality of fixedly disposed teeth are rotating at substantially the same rotational speed as the first plurality of fixedly disposed teeth.

10. A method as in claim 7, wherein the rotating means comprises a coil spring frictionally contacting the drive shaft and the spindle and the spindle rotating step comprises transmitting rotation of the drive shaft to the spindle and the driver bit via the coil spring while the clutch is disengaged.

11. A method as in claim 10, wherein the clutch comprises a first plurality of fixedly disposed teeth, a plurality of clutch pins pivotally disposed proximal to the first plurality of fixedly disposed teeth, and a second plurality of fixedly disposed teeth disposed so as to oppose the first plurality of fixedly disposed teeth and the clutch pins, and wherein the clutch is engaged when the first plurality of fixedly disposed teeth engage the second plurality of fixedly disposed teeth, and wherein the clutch engaging step comprises engaging the first plurality of fixedly disposed teeth with the second plurality of fixedly disposed teeth while the second plurality of fixedly disposed teeth are rotating at substantially the same rotational speed as the first plurality of fixedly disposed teeth.

12. A method as in claim 11, wherein the spindle rotates substantially at about 6000 rpm before and after the screw fastening step.

13. A screw driver comprising:

a housing, a motor disposed within the housing, a drive shaft coupled to the motor, the drive shaft defining an axial direction and the motor being arranged and constructed to rotate the drive shaft at a rotational speed within a range of about 5000 rpm to about 7000 rpm, a spindle rotatably supported by the housing and being movable in the axial direction between a first position and a second position, a driver bit coupled to the spindle, a clutch coupling the drive shaft to the spindle when the clutch is engaged, the clutch comprising a first plurality of fixedly disposed teeth, a plurality of clutch pins pivotally disposed proximal to the first plurality of fixedly disposed teeth, and a second plurality of fixedly disposed teeth disposed so as to oppose the first plurality of fixedly disposed teeth and the clutch pins, wherein the first plurality of fixedly disposed teeth engage the second plurality of fixedly disposed teeth when the spindle is disposed substantially in the first position and the first plurality of fixedly disposed teeth do not engage the second plurality of fixedly disposed teeth when the spindle is disposed in the second position, wherein the motor, the drive shaft, the clutch and the spindle are arranged and constructed to rotate the spindle and the driver bit within the rotational speed range of about 5000 rpm to about 7000 rpm when the clutch is engaged during a fastening operation, a coil spring frictionally contacting the drive shaft and the spindle, and a stopper fixedly mounted within the housing, wherein the coil spring and the stopper are arranged and constructed to permit rotation of the spindle together with the drive shaft when the spindle is disposed substantially in the first position and before the clutch has engaged, and to impede rotation of the spindle when the spindle is disposed in the second position, and wherein the motor, the drive shaft, the spindle, the clutch and the coil spring are further arranged and constructed to rotate the spindle substantially within the rotational speed range of about 5000 rpm to about 7000 rpm before the first plurality of fixedly disposed clutch teeth engage the second plurality of fixedly disposed clutch teeth.

14. A screw driver as in claim 13, wherein the motor, the drive shaft, the spindle, the clutch and the coil spring are arranged and constructed to rotate the spindle substantially at a rotational speed of about 6000 rpm before the first plurality of fixedly disposed clutch teeth engage the second plurality of fixedly disposed clutch teeth.

* * * * *